United States Patent
Raz et al.

(10) Patent No.: US 11,734,143 B2
(45) Date of Patent: Aug. 22, 2023

(54) PERFORMANCE MEASUREMENT OF PREDICTORS

(71) Applicant: International Business Machines Corporation, Armonk, NY (US)

(72) Inventors: Orna Raz, Haifa (IL); Eitan Farchi, Pardes Hana (IL); Marcel Zalmanovici, Kiriat Motzkin (IL)

(73) Assignee: International Business Machines Corporation, Armonk, NY (US)

( * ) Notice: Subject to any disclaimer, the term of this patent is extended or adjusted under 35 U.S.C. 154(b) by 629 days.

(21) Appl. No.: 16/845,092

(22) Filed: Apr. 10, 2020

(65) Prior Publication Data

US 2021/0319354 A1 Oct. 14, 2021

(51) Int. Cl.
*G06F 11/34* (2006.01)
*G06N 20/00* (2019.01)
*G06V 10/44* (2022.01)
*G06V 10/82* (2022.01)
*G06F 18/214* (2023.01)
*G06V 10/764* (2022.01)

(52) U.S. Cl.
CPC ...... *G06F 11/3409* (2013.01); *G06F 11/3495* (2013.01); *G06F 18/214* (2023.01); *G06N 20/00* (2019.01); *G06V 10/457* (2022.01); *G06V 10/764* (2022.01); *G06V 10/82* (2022.01)

(58) Field of Classification Search
None
See application file for complete search history.

(56) References Cited

U.S. PATENT DOCUMENTS

| 10,089,581 | B2 | 10/2018 | Flores et al. |
| 2012/0158623 | A1* | 6/2012 | Bilenko ............ G06N 20/00 706/12 |
| 2015/0379072 | A1 | 12/2015 | Dirac et al. |
| 2017/0372232 | A1 | 12/2017 | Maughan et al. |

OTHER PUBLICATIONS

Yeounoh Chung, Tim Kraska, Steven Euijong Whang, Neoklis Polyzotis, Slice Finder: Automated Data Slicing for Model Interpretability, SysML, Apr. 2, 2019.
Na, Processing Data to Improve Machine Learning Models Accuracy, SysML, Nov. 29, 2018.

* cited by examiner

*Primary Examiner* — Leon Flores
(74) *Attorney, Agent, or Firm* — Ziv Glazberg (57) ABSTRACT

A method, apparatus and a product for determining a performance measurement of predictors. The method comprises obtaining a dataset comprising data instances. Each data instance is associated with a label; obtaining a predictor. The predictor is configured to provide a prediction of a label for a data instance; determining a plurality of data slices that are subsets of the dataset. computing, for each data slice in the plurality of data slices and based on an application of the predictor on each data instance that is mapped to the data slice, a performance measurement that is indicative of a successful label prediction for a data instance comprised by the data slice, whereby obtaining a plurality of performance measurements; based on the plurality of performance measurements, computing a performance measurement of the predictor over the dataset; if the performance measurement of the predictor is below a threshold, performing a mitigating action.

18 Claims, 6 Drawing Sheets

| MinP | 80% |
|---|---|
| SIZE OF FEATURES SPACE | 1000 |
| MinSize | 10·1000=10000 |

| Slice | PREDICTOR SUCCESS RATIO | NUMBER OF DATA INSTANCES | PERFORMANCE MEASURMENT |
|---|---|---|---|
| A | 90% | 50000 | 1 |
| B | 95% | 20000 | 1 |
| C | 70% | 15000 | -1 |
| D | 95% | 900 | -1 |

| PREDICTOR GRADE | 0 |
|---|---|

FIG. 4

PERFORMANCE MEASUREMENT OF PREDICTORS

TECHNICAL FIELD

The present disclosure relates to machine learning models in general, and to performance measurement of machine learning models, in particular.

BACKGROUND

Machine Learning (ML) algorithms are at the front of academic research as well as commercialized services and products. As the problem of finding a predictive model is almost solved, new problems are encountered. One problem is the robustness of predictive models "outside the lab", "in the field" and during production.

Predictive models, such as implementing Machine Learning techniques, depend on data. The predictive model may be as good as the data that was used in order to train it. If the training data provides an adequate representation of the real world data, the predictive model is likely to provide relatively good predictions when used in production. Once the model is trained and is being used in order to make real predications in real life scenarios, it may encounter data that is substantially different than the data that was used in order to train the model, and as a result, it may provide unreliable predictions and generally perform below par.

BRIEF SUMMARY

One exemplary embodiment of the disclosed subject matter is a method comprising: obtaining a dataset, wherein the dataset comprising data instances, wherein each data instance is associated with a label; obtaining a predictor, wherein the predictor is configured to provide a prediction of a label for a data instance; determining a plurality of data slices, wherein at least one data slice of the plurality of data slices comprising a data instance comprised by the dataset; computing, for each data slice in the plurality of data slices, a performance measurement of the predictor over the data slice, wherein said computing is based on an application of the predictor on each data instance that is mapped to the data slice, wherein the performance measurement is indicative of a successful label prediction for a data instance comprised by the data slice, whereby obtaining a plurality of performance measurements; based on the plurality of performance measurements of the plurality of data slices, computing a performance measurement of the predictor over the dataset; and in response to determining that the performance measurement of the predictor is below a threshold, performing a mitigating action.

Another exemplary embodiment of the disclosed subject matter is a method comprising: obtaining a dataset, wherein the dataset comprising data instances, wherein each data instance is associated with a label; obtaining a predictor, wherein the predictor is configured to provide a label prediction for a data instance; determining a plurality of data slices, wherein at least one data slice of the plurality of data slices comprising a data instance comprised by the dataset; determining a slice for analysis, wherein the plurality of data slices comprise one or more sub-slices of the slice for analysis, wherein the one or more sub-slices consist of instances that are comprised by the slice for analysis; computing, for each sub-slice of the slice for analysis, a performance measurement of the predictor over the sub-slice, wherein said computing is based on an application of the predictor on each data instance that is mapped to the sub-slice, wherein the performance measurement is indicative of a successful prediction for a data instance comprised by the sub-slice, whereby obtaining a plurality of performance measurements; based on the plurality of performance measurements of the plurality of sub-slices, computing a performance measurement of the predictor over the slice for analysis; and in response to determining that the performance measurement of the predictor over the slice for analysis is below a threshold, performing a mitigating action.

Yet another exemplary embodiment of the disclosed subject matter is a computer program product comprising a non-transitory computer readable storage medium retaining program instructions, which program instructions when read by a processor, cause the processor to perform: obtaining a dataset, wherein the dataset comprising data instances, wherein each data instance is associated with a label; obtaining a predictor, wherein the predictor is configured to provide a prediction of a label for a data instance; determining a plurality of data slices, wherein at least one data slice of the plurality of data slices comprising a data instance comprised by the dataset; computing, for each data slice in the plurality of data slices, a performance measurement of the predictor over the data slice, wherein said computing is based on an application of the predictor on each data instance that is mapped to the data slice, wherein the performance measurement is indicative of a successful label prediction for a data instance comprised by the data slice, whereby obtaining a plurality of performance measurements; based on the plurality of performance measurements of the plurality of data slices, computing a performance measurement of the predictor over the dataset; and in response to determining that the performance measurement of the predictor is below a threshold, performing a mitigating action.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to verify that a predictor provides relatively accurate and precise predictions. A performance measurement, such as F1-Score, Accuracy, or the like, may be utilized to measure the performance of the predictor. The performance measurement may be calculated over an entire dataset, such as the training dataset of the predictor, the testing dataset of the predictor, a production dataset, or the like. However, there may be slices of the dataset on which the predictor may perform below a threshold while performing above the same threshold on other slices of the same dataset. Such below-par performance may be concealed in the overall performance measurement due to the above-par performance in the other slices. As an example, consider a threshold of 85% as indicating sufficiently good prediction. There may be a first slice in the dataset over which the performance of the predictor may be below the threshold, such as, for example, 80%, while there may be another slice in the dataset on which the predictor may perform above the threshold, such as, for example 95%. Using overall performance measurement, the predictor may have an average performance, which is over the threshold (e.g., 88%, 90%, 92%, or the like). Such performance may be considered to be a good performance, even though the predictor may not perform well over some data slices, and specifically on the first data slice. Hence, it may be desired to provide performance measurement for predictors that takes into account its performance, individually, over the different slices of the data. Additionally or alternatively, it may be desired to provide a performance measurement method in which below par performance is not canceled by above par performance.

Another technical problem dealt with by the disclosed subject matter is to verify that a predictor is valid with respect to a slice of the dataset. In some exemplary embodiments, a predictor may be considered as "valid" with respect to a slice thereof, if the performance measurement when applied over the slice, is above a threshold. In some exemplary embodiments, a slice in the dataset may impact the performance of the predictor more than another slice, regardless of the number of instances comprised by each slice. As an example, a predictor may be configured to determine, based on a Magnetic Resonance Imaging (MRI) scan of a patient, the odds that the patient has cancer. In order to train such a predictor, a plurality of MRI scans and associated labels may be provided thereto. The labels may be a number between 0 and 100, indicating the likelihood that the patient has cancer. The predictor may be trained, tested, verified, or the like using the plurality of MRI scans and labels thereof. In case that the predictor is valid it may be provided to a production environment such as to be utilized by doctors, in hospitals, or the like, in order to provide predictions regarding cancer based on MRI scans of patients. The predictor may be designated to be deployed in a city having a high morbidity rate among people in their twenties. Hence, it may be desired to assess the quality of the predictor over a portion of a dataset comprising records of people in their twenties, regardless of the age distribution in the city. Put differently, in some cases, even if the overall performance measurement may be above a desired threshold, the performance measurement over the slice of patients in their twenties may be below the desired threshold, and a different solution should be used for such portion of the population. This may be the case, even if the slice is relatively negligible, such as only 10% of the population, only 5% of the population, and even if the predictor performs well over the remainder of the population.

Yet another technical problem dealt with by the disclosed subject matter is to provide a method for measuring a performance of a predictor. In some exemplary embodiments, the performance of the predictor may be measured by utilizing techniques such as Accuracy, Root-Mean-Square Error (RMSE), F-Score, or the like. However, those techniques are general, usually compute an average over all data records, and may not be configured to consider specific characteristics of the data, specific characteristics of the problem that the predictor is configured to solve, or the like.

One technical solution is to obtain a dataset. The dataset may be sliced into data slices. Additionally or alternatively, a predictor may be obtained. The predictor may be useful for predicting labels for data instances in the data slices. A plurality of performance measurements may be computed by computing, for each data slice, a performance measurement of the predictor over the data slice. A performance measurement of the predictor over the dataset may be computed based on the plurality of performance measurements over the different data slices. In case that the performance measurement of the predictor over the dataset is below a threshold, a mitigating action may be performed. In some cases, after the mitigating action is implemented, the predictor may be utilized. Additionally or alternatively, in case that the performance measurement of the predictor is above the threshold, the predictor may be utilized. Additionally or alternatively, in case that the performance measurement of the predictor is below the threshold, the predictor may be utilized while performing the mitigating action.

In some exemplary embodiments, the dataset may be obtained by utilizing hardware. In that embodiment, the mitigating action may comprise replacing the hardware. Referring again to the MRI example, a predictor that is performing below par may be indicative to a malfunction in the MRI scanner. Hence, the mitigating action may comprise replacing a module of the MRI scanner, replacing the hardware device altogether, or otherwise attending to the malfunction.

In some exemplary embodiments, the predictor may be trained based on a machine learning model such as an Artificial Neural Network (ANN), a Deep Neural Network (DNN), Ordinary Least Squares Regression, Logistic Regression, Support Vector Machines, or the like. The dataset may comprise data instances. Each data instance may comprise feature values in a feature space. The feature values may be utilized as an input for the machine learning model, as an input for the predictor, or the like. In some exemplary embodiments, the mitigating action may comprise obtaining an additional dataset and retraining the predictor therewith. Additionally or alternatively, the mitigating action may comprise changing the architecture of the model used to train the predictor, such as modifying an architecture of a network-based model, modifying the number of layers, the number of nodes in a layer, or the like. Additionally or alternatively, the mitigating action may comprise changing the model utilized by the predictor. Additionally or alternatively, the mitigating action may comprise feature engineering in order to change a feature, add a feature, remove a feature, or the like.

In some exemplary embodiments, the predictor may be provided as part of a new version of an existing product, such as a software tool that utilizes prediction capabilities of the predictor. The mitigating action may comprise rejecting the new version, reverting back to a previously existing version of the product, or the like.

As an example for a mitigating action comprising changing the model used to train the predictor, the predictor may utilize a ANN, and may have been trained using Gradient descent. The mitigating action may comprise changing the architecture of the ANN by adding a layer to the ANN, adding a node to a layer comprised by the ANN, removing a layer from the ANN, removing a node from a layer comprised by the ANN, modifying connectivity between nodes in the ANN, or the like. Additionally or alternatively, the mitigating action may comprise re-training the ANN by utilizing a different algorithm than Gradient descent, such as for example, Newton's method, Conjugate gradient, Levenberg-Marquardt algorithm, or the like.

In some exemplary embodiments, a hardware processor may be configured to execute the predictor in order to predict, to estimate, to compute, or the like, a predicted label for each instance. Additionally or alternatively, the predictor may provide a confidence level to the predicted label.

Another technical solution is to compute a performance measurement of the predictor over one data slice. For each sub data slice of the data slice a performance measurement of the predictor over the sub data slice may be computed. The performance measurement of the predictor over the data slice may be computed based on the performance measurements over each sub data slice. In some exemplary embodiments, the data slice may a data slice for analysis. A data slice for analysis may be obtained, defined by a constraint, or the like. Additionally or alternatively, the data slice for analysis may be determined by a domain expert. The data slice for analysis may represent a section of the dataset that may affect the performance measurement of the predictor in real life scenarios.

In some exemplary embodiments, a plurality of data slices of the dataset may be determined based on an external feature. In some exemplary embodiments, each data instance comprised by the dataset may comprise values of features in a features space. A value of another feature, that is excluded from and not comprised by the feature space, may be obtained. The other feature may be external to the feature space. At least one data slice may be determined based on the value of the other feature. As an example, each data instance comprised by the dataset may comprise records of people. Each record may comprise values of features such as age, weight and height. Another feature, Body Mass Index (BMI), may be obtained. For each data instance, a BMI value may be computed. A data slice may be determined based on the computed BMI value of each record (e.g. records having a BMI value below 90), even though the BMI value may not be provided to the predictor as input.

One technical effect of utilizing the disclosed subject matter is to provide an automated manner indicative of a hardware malfunction that affects the performance measurement of the predictor. As an example, in case that the dataset was obtained by utilizing a scanner and in case that the performance measurement of the predictor is below a threshold, it may be indicative that the tube of the scanner may need a replacement.

Another technical effect of utilizing the disclosed subject matter is a method that assess a machine learning model or a dataset utilized therefor more accurately compared to other techniques. A more accurate method may be a method that is configured to take into account data slices of the dataset, take into account use cases of the predictor, or the like. Other techniques may use some statistical aggregation of distances between labels and corresponding predicted labels overall the dataset. As a result, a relatively small data slice may have a relatively small effect on the performance measurement of the model. In contrast, in one embodiment of the disclosed subject matter, a performance measurement of the predictor over a data slice may be configured to be equal to a constant value in case that the predictor is performing above a threshold over the data slice and to a negation of the constant value in case that the predictor is performing below the threshold. As an example, a constant value may be one (1) and the negation may be minus one (−1). As a result, all data slices may have the same weight when computing a performance measurement of the predictor over the dataset.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Figure 1A:
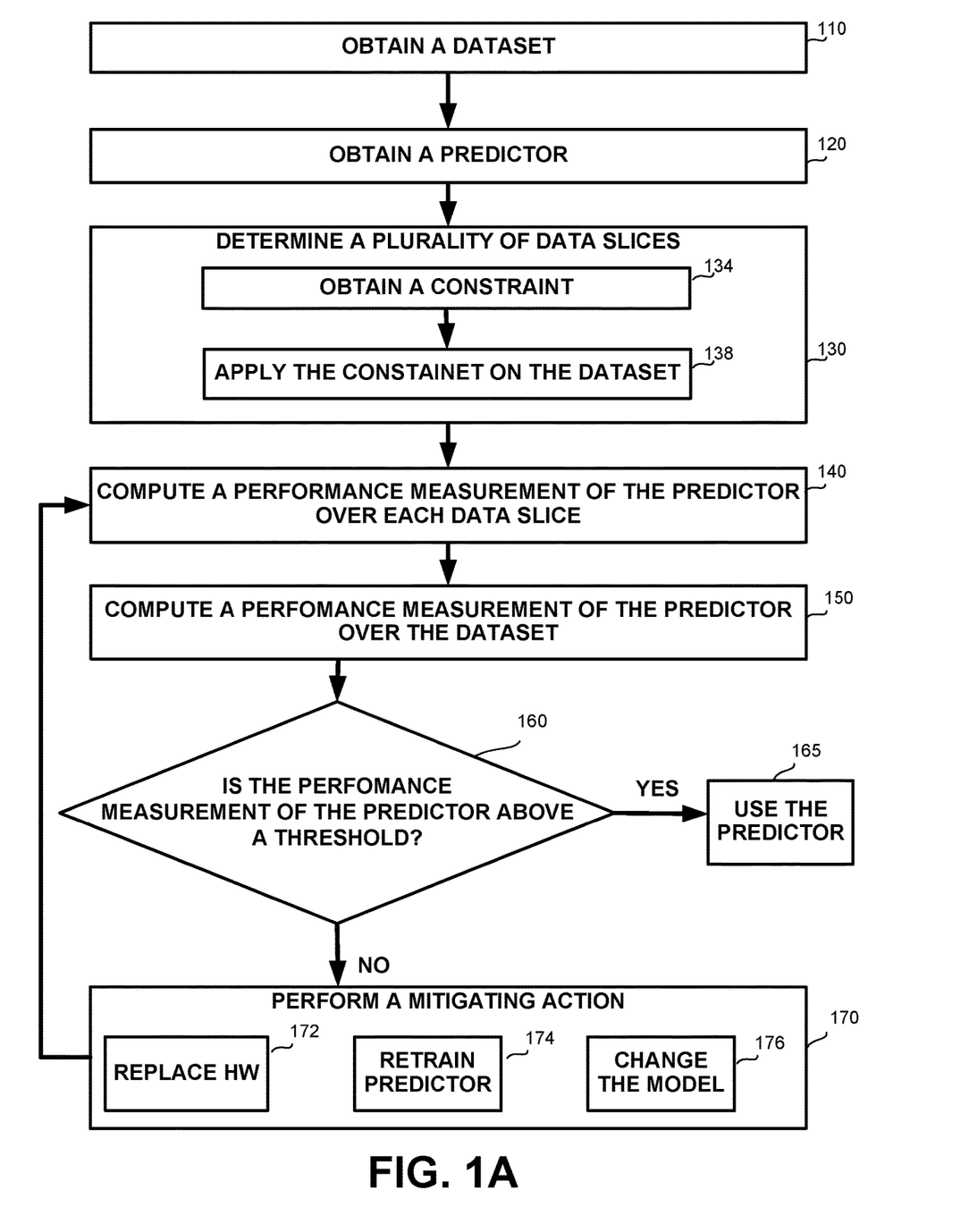
FIGS. 1A and 1B show a flowchart diagram of a method, in accordance with some exemplary embodiments of the disclosed subject matter.

Referring now to FIG. 1A showing a flowchart diagram of a method, in accordance with some exemplary embodiments of the disclosed subject matter.

On Step 110, a dataset may be obtained. The dataset may comprise a plurality of data instances. Each data instance of the plurality of data instances may be associated with a label. Additionally or alternatively, each data instance may comprise features values in a feature space. In some exemplary embodiments, the feature space may be an N-dimensional space, where N may be the number of features.

On Step 120, a predictor may be obtained. The predictor may be configured to predict a predicted label for a data instance. In some exemplary embodiments, the predictor may be a trained predictor. Additionally or alternatively, the predictor may be trained based on the dataset by utilizing algorithms such as but not limited to Linear Regression, Logistic Regression, Classification and Regression Tree (CART), Naïve Bayes, K-Nearest Neighbors (KNN), K-means, Principal Component Analysis (PCA), or the like. In some exemplary embodiments, the predictor may be retrieved, downloaded, transmitted or the like from a remote location. Additionally or alternatively, the predictor may be obtained from local memory. In some exemplary embodiments, the predictor may or may not be locally trained.

On Step 130, a plurality of data slices may be determined. Each data slice of the plurality of data slices may be a proper subset of the dataset. In some exemplary embodiments, two data slices may overlap, such as that both data slices may share a same data instance that is comprised by both. Additionally or alternatively, there may be an instance in the dataset that is not comprised by any of the data slices.

In some exemplary embodiments, a determination of the data slice may comprise identifying instances that are members of the data slice. Put differently, a data slice may be said to be determined when the members thereof are identified and can be grouped together. In some exemplary embodiments, the data slice may be determined by obtaining a definition of data slice and applying the definition to identify the instances that are included in the data slice.

In some exemplary embodiments, determining a data slice may comprise Steps 134 and Step 138. On Step 134, a constraint may be obtained. In some exemplary embodiments, the constraint may represent a definition of the data slice. The constraint may be a constraint on one or more feature values in the features space. On Step 138, the constraint may be applied on the dataset. Applying the constraint may comprise identifying at least one data instance for which the constraint is held, e.g., the one or more feature values of the at least one data instance are in line with the constraint. The at least one identified data instance may be a member of the data slice. As an example, the dataset may comprise records of people. Two constraints may be utilized, each of which defining a different data slice. One constraint, may define a data slice of people over the age of 50 and an another constraint may define a data slice of men. In that case, the two data slices may overlap as the dataset may comprise a record of a man that is over 50. Additionally or alternatively, a third constraint may define a data slice comprising records of women. In that case, the two data slices may be disjoint sets. Additionally or alternatively, a person of the age of 20 may choose to specify its gender as "other". In that case, a record comprising that person's data may not be comprised by any data slice. In some exemplary embodiments, the union of all data slices may be a strict subset of the dataset, so as to exclude at least one instance that is within the dataset and which is not included in any data slice.

In some exemplary embodiments, a user, such as a domain expert, may provide the definition of a data slice. As an example, the user may articulate the constraints that define the data slice. In some exemplary embodiments, the domain expert may have knowledge regarding a section of the dataset that may have an effect on the performance of the predictor in some use cases. Accordingly, the domain expert may provide a constraint that is configured to cover areas of interest in the dataset. As an example, a domain expert may be aware that there's a chance of minority discrimination, and accordingly may define data slices to cover minorities. A domain expert may define a data slice to cover Muslims when designing a tool to be implemented in Europe, but when designing a tool that is implemented in Saudi Arabia, the minority group of interest may be of Women, or of Christians.

In some exemplary embodiments, the constraint may be a constraint on a meta feature. A meta feature may be a feature that is excluded from an input that is provided to the predictor. In some exemplary embodiments, the meta feature may be indicative to an origin of a data instance, such as the sensor that obtained the data, a version of software utilized to process the data, or the like.

In some exemplary embodiments, the plurality of data slices may be determined in an automated manner, such as by utilizing slicing algorithm such as connectivity-based clustering, centroid-based clustering, distribution-based clustering, or the like.

On Step 140, a performance measurement of the predictor over each data slice may be computed. In some exemplary embodiments, the performance measurement may be indicative of a successful estimation of labels to data instances comprised by the data slice. In some exemplary embodiments, the performance measurement may measure how well the predictor predicts the actual label. In some exemplary embodiments, for each data instance of the dataset that is in the data slice, the predictor may be utilized to predict a label. The predicted label may be compared with the actual label, to determine whether the prediction is correct or not. The performance measurement may be computed based on the number of instances, based on the number of instances for which a correct prediction was provided, or the like. In some exemplary embodiments, the performance measurement may be based on, for example, F1 score, Accuracy, R-squared, RSME, or the like. In some exemplary embodiments, different data slices may have substantially different performance measurements. For example, the predictor may provide accurate predictions in one data slice, and tend to provide less reliable predictions in another data slice. In some exemplary embodiments, in case that the number of instances comprised by a data slice is below a first threshold or in case that the performance measurement of a data slice is below a second threshold the performance measurement of the data slice may be a value that is configured to cause a reduction in performance measurement. As an example, the value may be a constant value such as minus one (−1), zero (0), or the like.

Figure 4:
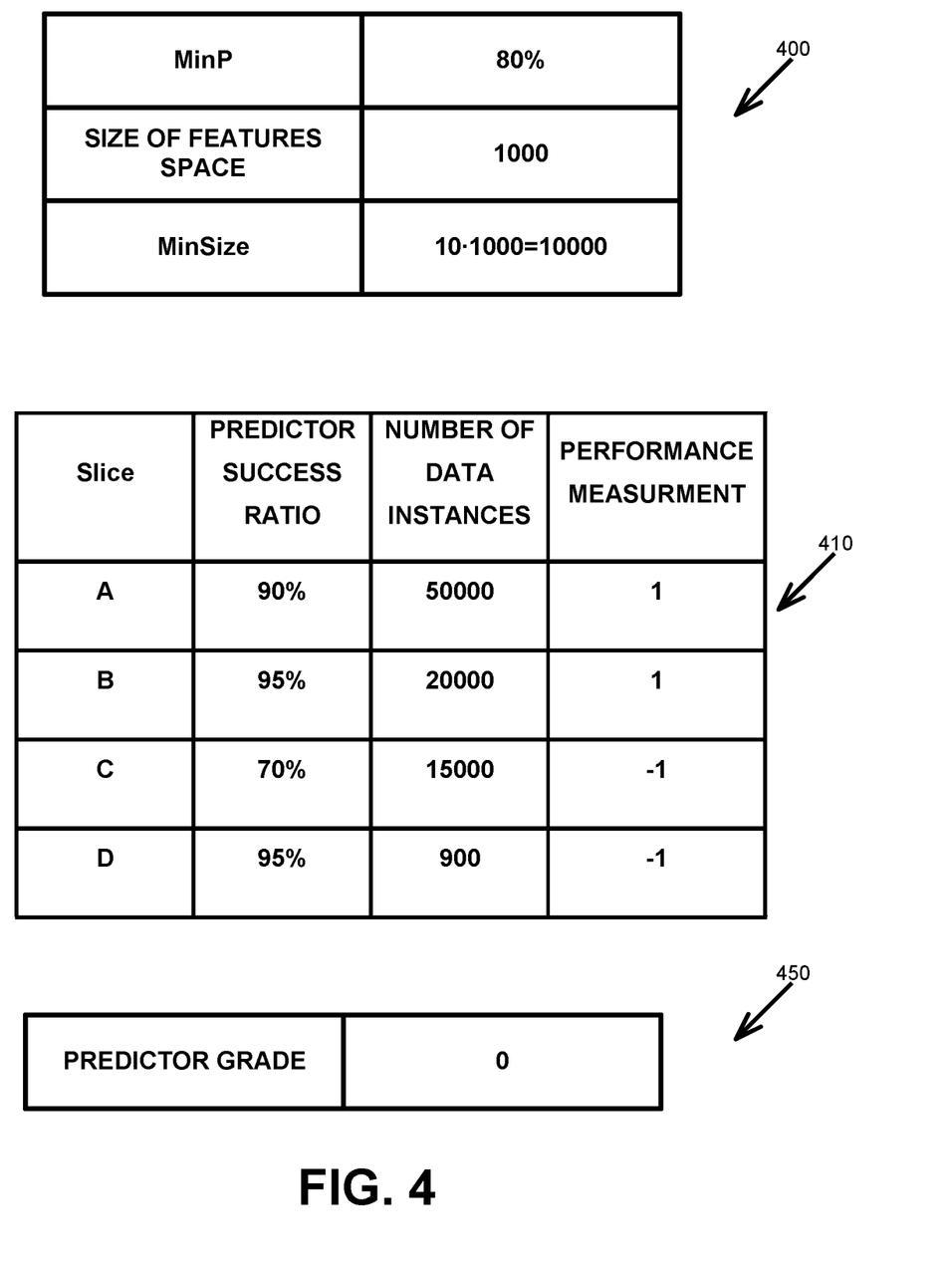
FIG. 4 shows a numeric example, in accordance with some exemplary embodiments of the disclosed subject matter.

Table 410 in FIG. 4 illustrates the performance measurement of the predictor over data slices. In the illustrated example, the performance measurement is based on the size of the slice and on the percentage of correct predictions in the data slice (success ratio). The success ratio of the predictor over data slice A may be 90% and 95% over data slice B. The number of data instances in slice A and in slice B may be above MinSize (see Table 400) and the success ratio of the predictor over slice A and over slice B may be above the success threshold level (see Table 400). As a result, the performance measurement over slice A and over slice B may be 1. Additionally or alternatively, the success ratio of the predictor over slice C may be 70% which may be below the success threshold level. As a result, the performance measurement of the predictor over slice C may be −1. The success ratio of the predictor over slice D may be 95% which is above the success threshold level. However, as the number of data instances in slice D may be below MinSize, the performance measurement of the predictor over slice D may be −1, even though the success ratio is above the success threshold level. It is noted that in some cases, in addition to or instead of relying on success ratio, the performance measurement may be based on confidence level in a prediction, such as being one if the average confidence level of the predictions in the data slice is above a confidence level and minus one if the average confidence level of the predictions in the data slice is below the confidence level.

It is noted that in some cases, the performance measurement of the data slice may be based on performance measurements of sub-slices thereof.

On Step 150, a performance measurement of the predictor over the dataset may be computed. In some exemplary embodiments, Step 140 may result in a plurality of performance measurements. In that embodiment, the performance measurement over the dataset may be an aggregation of the plurality of performance measurements, such as an average, a summation, a weighted mean, or the like. In case of a weighted mean, the weights may be based on the sizes of the data slices, the size of the dataset, the proportion of each data slice, or the like. Additionally or alternatively, the weights may be based on input from the user, thus, for example, reflecting the importance of the data slice in that domain and usage for that user.

As data slices may overlap, it may be noted that a weighted mean or any other weighted statistical aggregation of the plurality of performance measurements may differ from weighted statistical aggregation.

On Step 160, it may be determined whether the performance measurement of the predictor over the dataset is below a threshold or above the threshold. In case that the performance measurement of the predictor over the dataset is above the threshold, Step 165 may be performed. Additionally or alternatively, in case that the performance measurement of the predictor is below the threshold, a mitigating action may be performed, as illustrated in Step 170.

In some exemplary embodiments, the threshold may be a confidence level threshold, a success rate threshold, or the like. In some exemplary embodiments, the threshold may be predetermined, may be computed, such as based on previous training sessions of the same predictor, based on training sessions of similar predictors, based on the performance measurement of a previous version of the predictor (e.g., prior to being retained), or the like, may be retrieved from a configuration file, defined by a user, or the like.

On Step 165, as the performance measurement of the predictor is above a threshold, the predictor may be utilized.

In some exemplary embodiments, the predictor may be utilized in order to provide a predicted label for a data instance that is not comprised by the dataset. In some exemplary embodiments, the predictor may be deployed in the field, may be provided as part of an update of a software utilizing the predictor, or the like.

On Step 170, as the performance measurement of the predictor over the dataset is below a threshold, a mitigating action may be performed.

In some exemplary embodiments, the mitigating action may comprise replacing a hardware device (172). In some exemplary embodiments, obtaining the dataset may comprise utilizing a hardware device. A performance measurement of the predictor below a threshold may be indicative to a hardware failure. Hence, the hardware or a component thereof may be replaced, repaired, or the like.

In some exemplary embodiments, the mitigating action may comprise re-training the predictor (174). Re-training the predictor may comprise obtaining another dataset to be used for training the predictor. In some exemplary embodiments, the other dataset may include instances in data slices in which the predictor performs below par. Additionally or alternatively, the other dataset may include instances in data slices in which there were insufficient number of instances. In some exemplary embodiments, the other dataset may extend the previously used dataset. In some exemplary embodiments, the other dataset may extend the previously used dataset by comprising one or more data slices having a performance measurement for which the performance measurement of the dataset is below a performance threshold. Additionally or alternatively, the other dataset may extend the previously used dataset by comprising one or more data slices in which the number of data instances comprised by the previously used dataset is less than a minimal size threshold.

In some exemplary embodiments, the predictor may be trained based on a machine learning model. In that embodiment, the mitigating action may comprise changing the network architecture, the algorithm utilized to train the network, or the like (176). In some exemplary embodiments, layers may be added to the ANN, a layer may be removed from the ANN, a node may be added to the ANN, connectivity between nodes or layers may be modified, or the like. Additionally or alternatively, the action may comprise changing the machine learning algorithm to a different machine learning algorithm. As an example, the predictor may be trained based on a decision tree classifier. The mitigating action may comprise changing the machine learning algorithm into a random forest classifier and retraining the predictor, changing a machine learning algorithm into a rule based logic, directing the input directly to a human, or the like.

It is noted that after the mitigation action is performed, the predictor may be re-assessed (Steps 140-160). In case, the performance measurement of the predictor after the mitigating action is implemented is above the threshold, the predictor may be utilized (165).

Figure 1B:
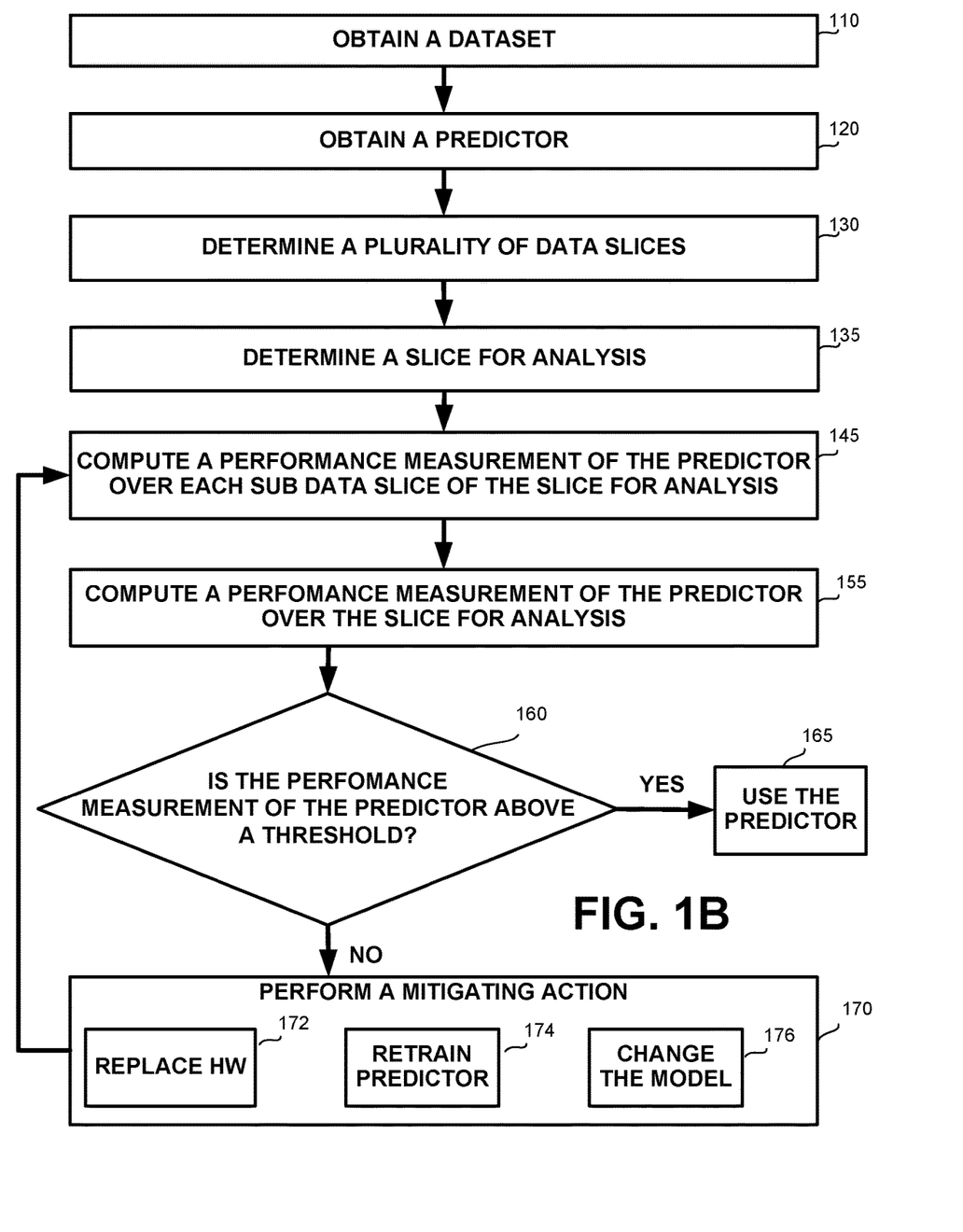

Referring now to FIG. 1B showing a flowchart diagram of a method, in accordance with some exemplary embodiments of the disclosed subject matter.

On Step 135, a slice for analysis may be determined. In some exemplary embodiments, the slice for analysis may be a data slice of the dataset. In some exemplary embodiments, the slice for analysis may be determined by a domain expert. The domain expert may select the slice for analysis from the plurality of data slices. The slice for analysis may be of importance as a performance measurement over the slice of analysis may be of importance for a real life scenario. In some exemplary embodiments, the influence of a performance measurement over the slice of analysis may have an impact that is below a threshold on the performance measurement of the predictor over the dataset as the number of data instance comprised by the slice for analysis may be relatively small compared to other data slices.

As an example, a predictor may be provided with an image of a cat or with an image of a dog. The predictor may be configured to provide a decision whether the image is an image of a cat or an image of a dog. As most cats are smaller than most dogs, the soft spot of the predictor may be with a data slice comprising images of small dogs. Small dogs may be dogs weighting below 10 Kg, below 5 Kg, or the like. Additionally or alternatively, a soft spot of the predictor may be with a data slice comprising large cats. A large cat may be a cat weighting above 20 Kg, above 25 Kg, or the like. A domain expert may decide that a data slice for analysis is a data slice comprising small dogs. Additionally or alternatively, the domain expert may decide that the data slice for analysis is a data slice comprising large cats. As another example, as data slices may be defined over the feature space and may not require the labels, the domain expert may decide that a data slice for analysis may comprise any data instances where the weight is in a certain range, such as 10 Kg to 25 Kg, resulting in a data slice for analysis comprising both cat and dog data records. In case that the predictor is performing below a threshold over the data slice for analysis it may fail in real life scenarios, even if the overall performance of the predictor is above 80%, above 90%, or the like. Additionally or alternatively, in case that number of instances comprised by the data slices for analysis is below a threshold, the performance measurement of the predictor may not be indicative to a success ratio of the predictor in a production environment.

Additionally or alternatively, the slice for analysis may be selected automatically or semi-automatically. An automated selection or suggestion may be performed based on past activities of domain experts. In some exemplary embodiments, a meta-predictor may be trained to predict, based on a set of data slices, definitions thereof, parameters of the feature space, size of each data slice, size of the dataset, combination thereof, or the like, the data slice that the domain expert will select. The meta-predictor may be trained in view of previously collected information in which domain experts have chosen the data slice manually. In semi-automatic implementation, user verification may be utilized to improve prediction even further.

On Step 145, a performance measurement of the predictor over each sub data slice of the slice for analysis may be computed. The performance measurement of the predictor over each sub data slice may be determined as in Step 140 of FIG. 1A.

In some exemplary embodiments, a sub-slice may be a slice of the data slice for analysis. As an example, if the slice for analysis comprises men, then a sub-slice may be men that are taller than 180 cm. A sub-slice is subset of the data slice. In some cases, the slice for analysis may be referred to as a super-slice of the sub-slice. In some cases, the plurality of data slices of Step 130 may comprise sub-slices as well as slices. Additionally or alternatively, the sub-slices may be determined after the slice for analysis is determined. In some exemplary embodiments, definitions used to create the data slices of Step 130 may be utilized to determine the sub-slices, e.g., by applying the constraints on the instances of the slice for analysis.

On Step 155, a performance measurement of the predictor over the slice for analysis may be computed. The performance measurement of the predictor over the slice for analysis may be computed as in Step 150 of FIG. 1A where the slice for analysis may be considered to be the dataset and each sub slice of the slice for analysis may be considered as a sub slice. Put differently, the dataset may be a super-slice as it comprises all the sub slices, including the slice for analysis. A data superset may comprise a plurality of data instances, each of which may be associated with a label. In that embodiment, a performance measurement of the predictor over the super slice is may be computed as the performance measurement of predictor over the dataset is computed.

Figure 2:
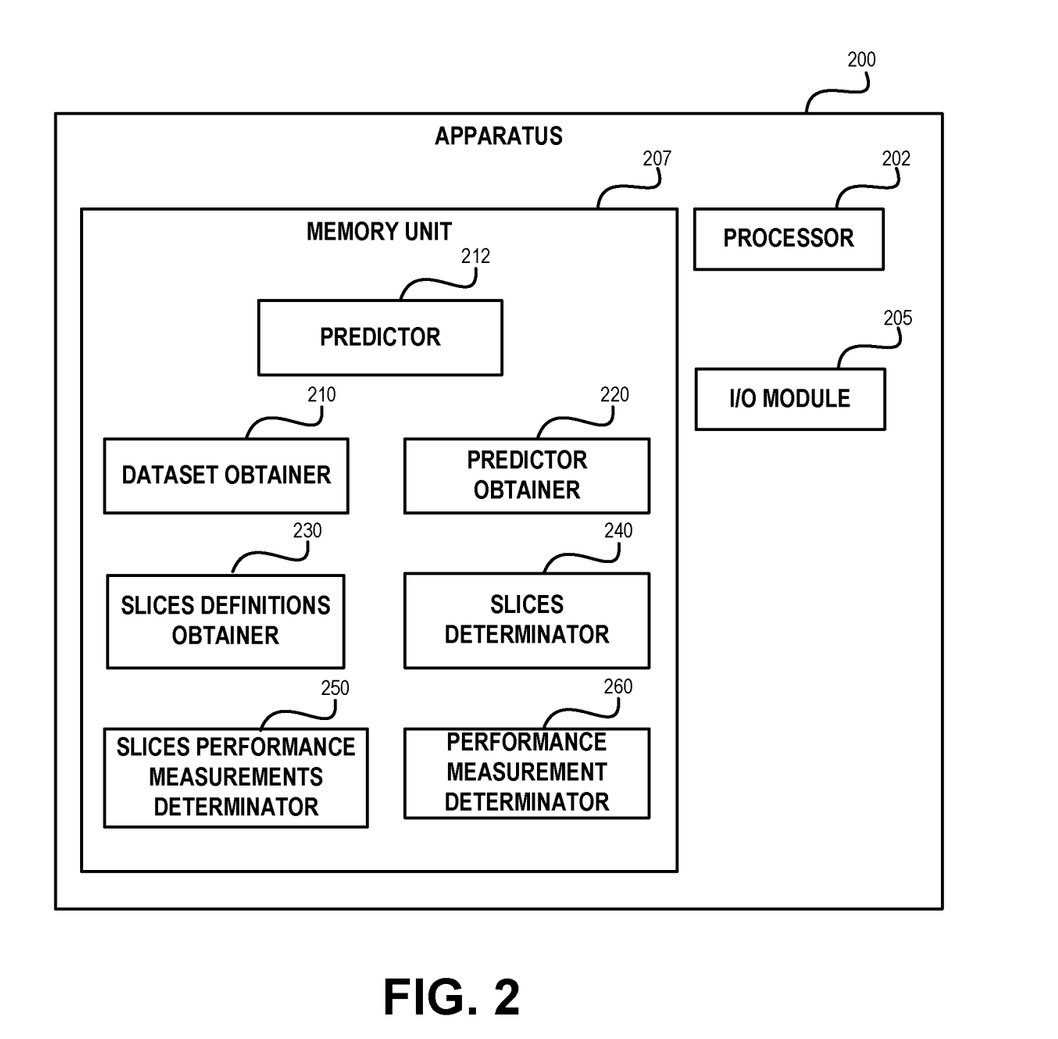
FIG. 2 shows a block diagram of an apparatus, in accordance with some exemplary embodiments of the disclosed subject matter.

Referring now to FIG. 2 showing a block diagram of an apparatus, in accordance with some exemplary embodiments of the disclosed subject matter.

In some exemplary embodiments, Apparatus 200 may comprise one or more Processor(s) 202. Processor 202 may be a Central Processing Unit (CPU), a microprocessor, an electronic circuit, an Integrated Circuit (IC) or the like. Processor 202 may be utilized to perform computations required by Apparatus 200 or any of it subcomponents.

In some exemplary embodiments of the disclosed subject matter, Apparatus 200 may comprise an Input/Output (I/O) module 205. I/O Module 205 may be utilized to provide an output to and receive input from a user, such as, for example to provide a performance measurement of the predictor over a data slice, to provide a performance measurement of the predictor over a dataset, to obtain a dataset, to obtain a predictor, to obtain a constraint defining a data slice, to obtain a constraint defining a slice for analysis, or the like.

In some exemplary embodiments, Apparatus 200 may comprise Memory 207. Memory 207 may be a hard disk drive, a Flash disk, a Random Access Memory (RAM), a memory chip, or the like. In some exemplary embodiments, Memory 207 may retain program code operative to cause Processor 202 to perform acts associated with any of the subcomponents of Apparatus 200.

Memory 207 may comprise one or more components as detailed below, implemented as executables, libraries, static libraries, functions, or any other executable components.

In some exemplary embodiments, Dataset Obtainer 210 may be configured to obtain a dataset. The dataset may comprise data instances. Each data instance may comprise features values in a feature space. Additionally or alternatively, the dataset may comprise labels. Each data instance may be associated with a label. Additionally or alternatively, the dataset may comprise metadata values in a metadata space. Each data instance may be associated with at least one metadata value. As an example a data instance may comprise an image. The image may be obtained by utilizing a camera. Metadata associated with the data instance may comprise data regarding the camera, the date in which the image was obtained by the camera, or the like.

In some exemplary embodiments, Predictor Obtainer 220 may be configured to obtain a Predictor 212. Predictor 212 may be configured to provide a predicted label for an input such as a data instance. In some exemplary embodiments, Predictor 212 may be a computer program product that is retained in Memory Unit 207. In some exemplary embodiments, obtaining Predictor 212 may comprise training a machine learning model based on the dataset. In some exemplary embodiments, Predictor 212 may be trained based on feature values in a feature space. Additionally or alternatively, metadata values may be excluded from an input provided to the predictor. In some exemplary embodiments, Predictor Obtainer 220 may retrieve Predictor 212 from another computer, where Predictor was trained, generated or otherwise created.

In some exemplary embodiments, Slices Definitions Obtainer 230 may be configured to obtain definitions of data slices. Data slices may be defined by constraints on the features values, on the meta values, or the like. Additionally or alternatively, an external feature may be obtained and an external feature value may be computed. The external feature value may be a value of a feature that is not comprised by the features space, not comprised by the meta space, or the like. In some exemplary embodiments, the constraints may be obtained from a domain expert. Additionally or alternatively, data slices may be determined by utilizing algorithms such as connectivity-based clustering, centroid-based clustering, distribution-based clustering, or the like. In that case, Slices Definitions Obtainer 230 may be configured to obtain an algorithm, parameters thereof, or the like.

In some exemplary embodiments, Slices Determinator 240 may be configured to determine a data slice based on the definition of data slice obtained by Slices Definitions Obtainer 230. In some exemplary embodiments, Slices Determinator 240 may be configured to apply a constraint on the dataset in order to identify data instances that are members of a data slice. Additionally or alternatively, Slices Determinator 240 may be configured to apply a function based on a slicing algorithm.

In some exemplary embodiments, Slices Performance Measurements Determinator 250 may be configured to determine a plurality of performance measurements. Slices Performance Measurements Determinator 250 may be configured to determine a performance measurement for each data slice. Additionally or alternatively, Slices Performance Measurements Determinator 250 may be configured to determine a performance measurement for slices in a portion of the plurality of data slices.

In some exemplary embodiments, determining the performance measurement for each data slice may be based on the number of data instances comprised by the data slice. In that embodiment, in case that the number of instances comprised by the data slice is below a threshold, the performance measurements of the predictor over the data slice may be a constant value. In some exemplary embodiments, the threshold may be based on the size of the features spaces, such as the product of a constant value by the size of the features space. The constant value of the performance measurement over the data slice may be a negative number, indicating that the data slice may have a negative impact on the performance of the predictor over the dataset.

In some exemplary embodiments, Performance Measurement Determinator 260 may be configured to determine a performance measurement of the predictor over the dataset. The performance measurement of the predictor may be based on the plurality of performance measurements of the predictor over each data slice. Performance Measurement Determinator 260 may be configured to sum the performance measurements of the predictor over each data slice, to compute a weighted average of the performance measurements of the predictor, or the like. In that embodiments, the weights may be the number of data instances comprised by each data slice.

It is noted that in some embodiments, Performance Measurement Determinator 260 may be applied with respect to a data slice and Slices Performance Measurements Determinator 250 may be applied with respect to sub-slices of the data slice.

Figure 3A:
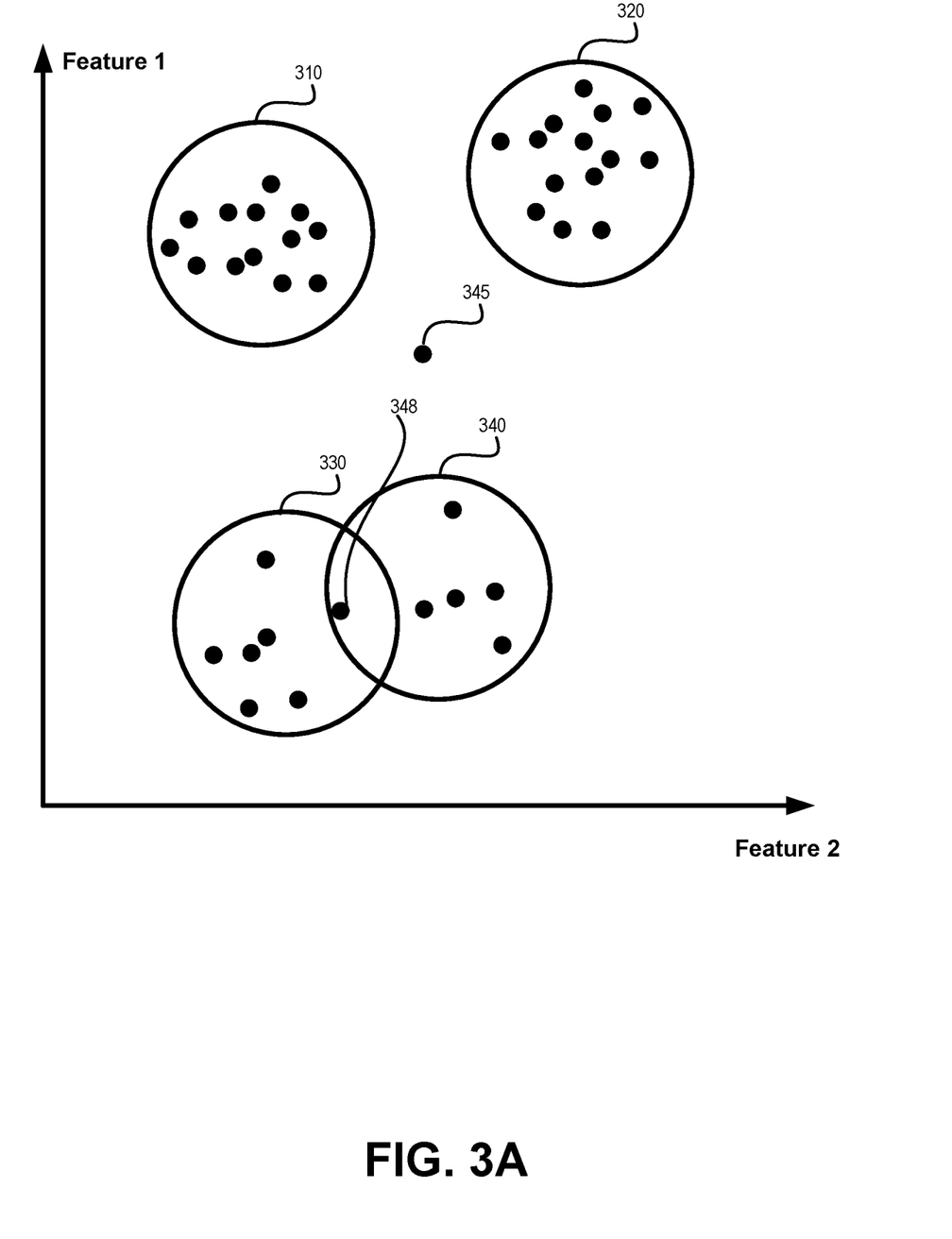
FIGS. 3A and 3B shows a schematic illustration of slicing of a dataset, in accordance with some exemplary embodiments of the disclosed subject matter.
Figure 3B:
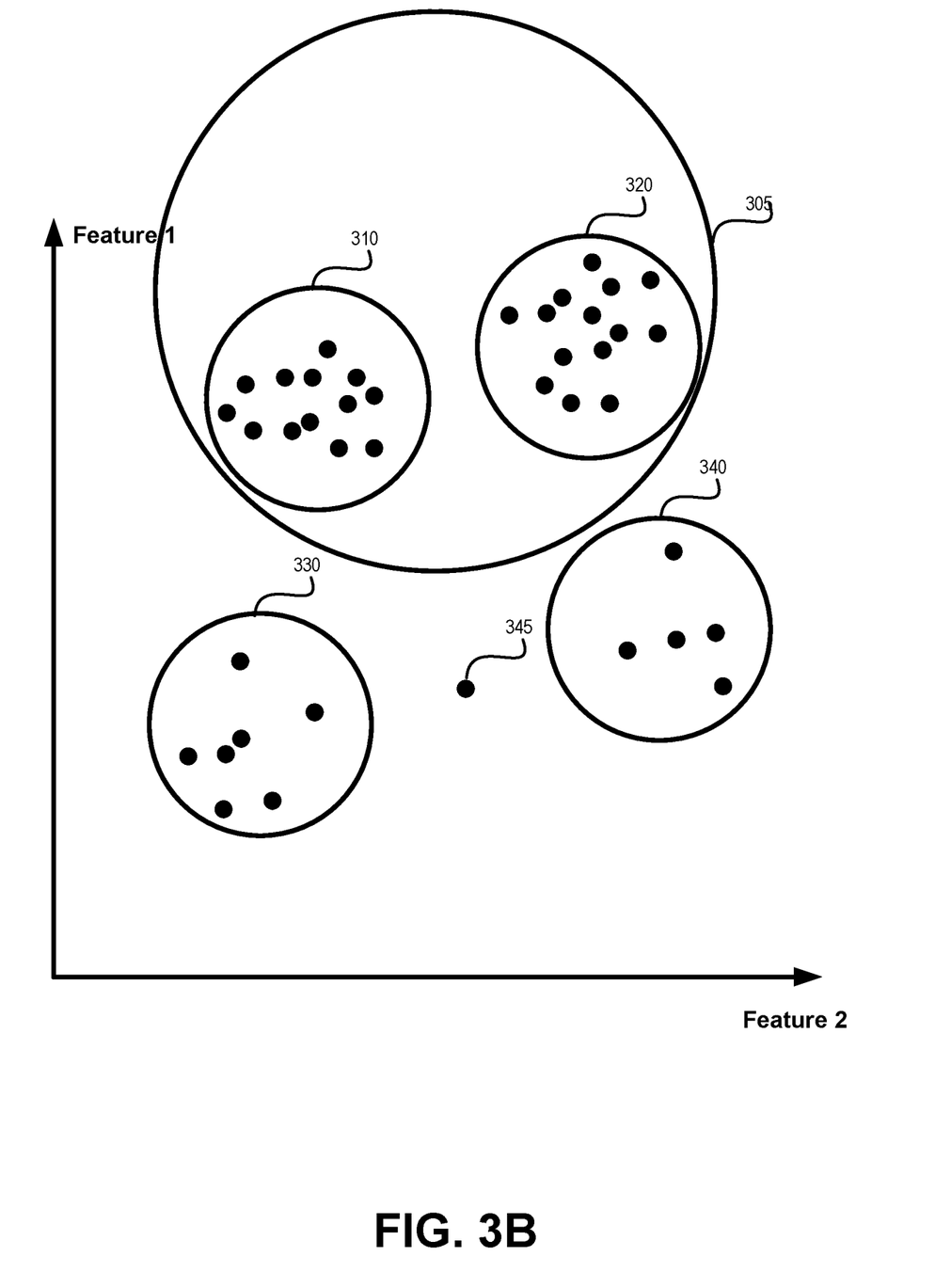

Referring now to FIGS. 3A and 3B showing an illustration of a dataset, data slices and data instances, in accordance with some exemplary embodiments of the disclosed subject matter.

FIG. 3A shows a 2D feature space. The illustrated dots of FIG. 3A represent data instances. Based on the data instances, Slice 310, Slice 320, Slice 330 and Slice 340 may be determined. In some exemplary embodiments, a performance measurement over each data slice may be computed. As is exemplified by Data Instance 345, some data instances may not be members of any data slice. In this example, there is exactly one such instance. However, the disclosed subject matter is not limited to such a case. Additionally or alternatively, as is exemplified by Data Instance 348, some data instance may be comprised by two or more data slices. In this example, there is exactly one data instance that is comprised by two data slices: Data Instance 348 is comprised by Data Slice 330 and Data Slice 340. However, the disclosed subject matter is not limited to such a case.

FIG. 3B illustrates a data slice for analysis with sub slices in the same 2D features space. Data Slices 310 and 320 may be sub slices of Slice For Analysis 305. Computing the performance measurement of Slice For Analysis 305 may be based on the performance measurement of Data Slices 310 and the performance measurement of Data Slice 320.

Referring now to FIG. 4 showing a numerical illustration of the disclosed subject matter and illustration of computing a performance measurement of a predictor, in accordance with some exemplary embodiments of the disclosed subject matter.

Table 400 may illustrate some initial configurations, including a success threshold level (MinP), a size of the feature space and a MinSize. As is illustrated, the success threshold level is 80% and the size of the feature space is 1,000. MinSize is defined to be 10 times the size of the feature space, hence, it is computed to be 10,000.

Table 410 may illustrate information regarding a data slice, such as the success ratio of a predictor over the data slice, number of instances comprised by each data slice and a value of performance measurement over the data slice.

In this example, the performance measurement may be computed by the formula:

$$g(s) = \begin{cases} -1 & P(s) < MinP \\ -1 & |s| < MinSize \\ 1 & P(s) \geq MinP \wedge |s| \geq MinSize \end{cases}$$

In some exemplary embodiments, s may refer to a data slice, |s| may refer to the number of data instances comprised by the data slice s. In some exemplary embodiments, P(s) may refer to a performance measurement, such Accuracy, F1-Score, or the like, of a predictor over the data slice s. In some exemplary embodiments, MinSize may refer to a minimal size threshold. The minimal size threshold may define the minimal number of data instances comprised by a data slice (e.g., s) that is required in order that P(s) may have a positive effect on the performance measurement of the predictor over the dataset. In some exemplary embodiments, the predictor may be trained based on a machine learning model. As machine learning models may require a sufficient number of examples to learn from, a minimal size may be required in order to ensure the correctness of a performance measurement over a data slice. Ensuring the correctness of the performance measurement over each data slice may be useful in ensuring the correctness of the model over the dataset. In some exemplary embodiments, MinP may refer to a minimal threshold on the performance measurement. In case that the performance measurement of a predictor is below the minimal threshold, the performance measurement of the predictor over the data slice may not have a positive effect on the performance measurement of the predictor over the dataset. As an example, the threshold may define a binary value—one or representing "good" and the other "bad", without accounting for "degrees" of how "bad" or "good" the prediction is. As an example, if MinP is 95%, then a performance measurement of 90% may be considered as bad as a performance measurement of 30%, 40%, or the like. Such use of binary value may be useful to ensure that below par performance is accounted for and is not deducted by above par performance in other data slices.

In the illustrated example, MinP is shown to be set as 80%. With respect to slice A: The predictor has a success ratio of 90% over slice A. The number of data instances is 50000 and it is larger than MinSize. Accordingly, the performance measurement of the predictor over slice A is 1. Similarly, the performance measurement of the predictor over slice B is also 1.

Although the number of data instances comprised by slice C is larger than MinSize, the success ratio of the predictor over slice C is 70% which is below the confidence level. Hence, the performance measurement of the predictor over slice C is set to be −1.

Regarding slice D, the success ratio is above MinP. However, the number of instances is below MinSize. Hence, the value of the performance measurement of the predictor over slice D is −1.

The performance of the predictor over the data set may be computed based on the formula:

$$f(DS) = \frac{\sum_{s \in} sg(s)}{|DS|},$$

wherein S is a set of data slices, s denotes a data slice, DS may represent the dataset and |DS| is the number of data instances comprised by the dataset DS. In that example, $$f(DS) = \frac{1 + 1 - 1 - 1}{1000} = 0,$$

as can be seen in Table 450. It is noted that DS may be a data slice in its own, and S may represent a set of sub-slices thereof. Put differently, DS may be a super-slice of the data slices in S.

In some exemplary embodiments, the performance measurement may be computed based on the formula:

$$g(s) = \begin{cases} -1 & P(s) < MinP \\ -1 & |s| < MinSize \\ W(s) \times P(s) & P(s) \geq MinP \wedge |s| \geq MinSize \end{cases}$$

In those embodiments, g(s) may be computed by utilizing weights associated with P(s) instead of a constant value. W(s) may denote a weight that may be associated with data slice s. In case that the number of data instances comprised by a data slice is below a minimal size threshold (MinSize), the data slice may have a constant negative effect on a performance measurement of a predictor over the dataset. Additionally or alternatively, in case that the performance measurement of the predictor over the data slice is below a minimal performance measurement threshold (MinP), the data slice may have a constant negative effect on the performance measurement of the predictor over the dataset.

As an example, the weights may be determined based on the number of instances comprised by each data slice. W(s) may be a ratio between |s| and |DS|. Referring to Table 410 of FIG. 4. The total number of data instances comprised by the data set may be 100,000. It may be noted that 100,000 is larger than the summation of the number of data instances comprised by each data slice as there may be data instances that are not comprised by any data slice. W(A), may denote a weight that is associated with data slice A. W(A) may be computed by 50000/100000=0.5. Additionally or alternatively W(B), may denote a weight that is associated with data slice B. W(B) may be computed by 20000/100000=0.2. P(C) may be −1 as the success ratio of the predictor over slice C is 70% which is below the confidence level. P(D) may be −1 as number of instances comprised by data slice C is below MinSize. The performance measurement of the predictor over the dataset may be given by $$f(DS) = \frac{0.5 \times 0.9 + 0.2 \times 0.95 - 1 - 1}{1000} = -0.0013825.$$

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    obtaining a dataset, wherein the dataset comprising data instances, wherein each data instance is associated with a label, wherein the dataset is a super-slice, wherein a data superset comprises a plurality of data instances each of which is associated with a label, wherein the data superset is divided into one or more super-slices;
    obtaining a predictor, wherein the predictor is configured to provide a prediction of a label for a data instance;
    determining a plurality of data slices, wherein at least one data slice of the plurality of data slices comprising a data instance comprised by the dataset;
    computing, for each data slice in the plurality of data slices, a performance measurement of the predictor over the data slice, wherein said computing is based on an application of the predictor on each data instance that is mapped to the data slice, wherein the performance measurement is indicative of a successful label prediction for a data instance comprised by the data slice, whereby obtaining a plurality of performance measurements;
    based on the plurality of performance measurements of the plurality of data slices, computing a performance measurement of the predictor over the dataset, whereby a performance measurement of the predictor over the super-slice is the performance measurement of the predictor over the dataset; and
    in response to determining that the performance measurement of the predictor is below a threshold, performing a mitigating action.

2. The method of claim 1, wherein said computing, for each data slice in the plurality of data slices, the performance measurement of the predictor over each data slice, comprises: computing the performance measurement of the predictor over a data slice, wherein said computing the performance measurement of the predictor over the data slice comprises:
    determining a number of data instances that are mapped to the data slice;
    in response to the number of data instances being below a threshold, determining the performance measurement of the predictor over the data slice to be a predetermined value.

3. The method of claim 1, wherein said computing, for each data slice in the plurality of data slices, the performance measurement of the predictor over the data slice, comprises: computing the performance measurement of the predictor over a data slice, wherein said computing the performance measurement of the predictor over the data slice comprises:
    determining a confidence level of the performance measurement for the data slice; and
    in response to determining that the confidence level is below a confidence level threshold, determining that the performance measurement of the predictor over the data slice to be a predetermined value.

4. The method of claim 1, wherein said determining the plurality of data slices comprising:
    obtaining a constraint representing a definition of a data slice; and
    applying the constraint on the dataset, whereby identifying one or more data instances that are members of the data slice defined using the constraint.

5. The method of claim 4, wherein the constraint is defined by a domain expert, wherein the constraint defines a constraint over a value of a feature comprised by a feature space, wherein each data instance is defined over the feature space.

6. The method of claim 5, wherein the feature is a meta feature, wherein the value of the meta feature is excluded from an input provided to the predictor.

7. The method of claim 1, wherein a data instance comprised by the dataset is one of:
    excluded from each of the plurality of data slices; and
    comprised by two or more data slices of the plurality of data slices.

8. The method of claim 1,
    wherein said computing the performance measurement of the predictor over $$f(D) = \frac{\sum_{s \in} sg(s)}{|D|},$$

the dataset is performed based on the formula: wherein D is the dataset, wherein s is a data slice, wherein S is the plurality of data slices, wherein g(s) provides a value of the performance measurement of the data slice s, wherein g(s) is defined as follows:

$$g(s) = \begin{cases} -1 & P(s) < MinP \\ -1 & |s| < MinSize \\ W(s) \times P(s) & P(s) \geq MinP \wedge |s| \geq MinSize \end{cases}$$

wherein P(s) is a value of the performance measurement of the predictor over the data slice s, wherein MinP is a minimal performance measurement threshold, wherein MinSize is a minimal size threshold, wherein MinSize is defined based on a number of features in a feature space of the dataset D, wherein W(s) is a value of a weight associated with the data slice s.

9. The method of claim 1, wherein the mitigating action is selected from:
replacing a hardware device utilized to obtain data instances;
replacing the predictor or machine learning model implemented thereby; and
retraining the predictor using a second labeled dataset.

10. A method comprising:
obtaining a dataset, wherein the dataset comprising data instances, wherein each data instance is associated with a label, wherein each data instance comprising feature values in a feature space;
 obtaining a value of an external feature for each data instance, wherein the external feature is not comprised by the feature space;
obtaining a predictor, wherein the predictor is configured to provide a prediction of a label for a data instance;
determining a plurality of data slices, wherein at least one data slice of the plurality of data slices comprising a data instance comprised by the dataset, wherein said determining a plurality of data slices comprises determining, with respect to at least one data slice, whether an instance is comprised by the at least one slice, based on the value the external feature of the instance,
computing, for each data slice in the plurality of data slices, a performance measurement of the predictor over the data slice, wherein said computing is based on an application of the predictor on each data instance that is mapped to the data slice, wherein the performance measurement is indicative of a successful label prediction for a data instance comprised by the data slice, whereby obtaining a plurality of performance measurements;
based on the plurality of performance measurements of the plurality of data slices, computing a performance measurement of the predictor over the dataset; and
in response to determining that the performance measurement of the predictor is below a threshold, performing a mitigating action.

11. A method comprising:
obtaining a dataset, wherein the dataset comprising data instances, wherein each data instance is associated with a label;
obtaining a predictor, wherein the predictor is configured to provide a prediction of a label for a data instance;
determining a plurality of data slices, wherein at least one data slice of the plurality of data slices comprising a data instance comprised by the dataset;
computing, for each data slice in the plurality of data slices, a performance measurement of the predictor over the data slice, wherein said computing is based on an application of the predictor on each data instance that is mapped to the data slice, wherein the performance measurement is indicative of a successful label prediction for a data instance comprised by the data slice, whereby obtaining a plurality of performance measurements, wherein said computing the performance measurement of the predictor over the dataset is performed based
on the formula:

$$f(D) = \frac{\sum_{s \in S} sg(s)}{|D|},$$

wherein D is the dataset, wherein s is a data slice, wherein S is the plurality of data slices, wherein g(s) provides a value of the performance measurement of the data slice s, wherein g(s) is defined as follows:

$$g(s) = \begin{cases} -1 & P(s) < MinP \\ -1 & |s| < MinSize \\ 1 & P(s) \geq MinP \wedge |s| \geq MinSize \end{cases}$$

wherein P(s) is a value of the performance measurement of the predictor over the data slice s, wherein MinP is a minimal performance measurement threshold, wherein MinSize is a minimal size threshold, wherein MinSize is defined based on a number of features in a feature space of the dataset D;
based on the plurality of performance measurements of the plurality of data slices, computing a performance measurement of the predictor over the dataset; and
in response to determining that the performance measurement of the predictor is below a threshold, performing a mitigating action.

12. A method comprising:
obtaining a dataset, wherein the dataset comprising data instances, wherein each data instance is associated with a label;
obtaining a predictor, wherein the predictor is configured to provide a label prediction for a data instance;
determining a plurality of data slices, wherein at least one data slice of the plurality of data slices comprising a data instance comprised by the dataset;
determining a slice for analysis, wherein the plurality of data slices comprise one or more sub-slices of the slice for analysis, wherein the one or more sub-slices consist of instances that are comprised by the slice for analysis;
computing, for each sub-slice of the slice for analysis, a performance measurement of the predictor over the sub-slice, wherein said computing is based on an application of the predictor on each data instance that is mapped to the sub-slice, wherein the performance measurement is indicative of a successful prediction for a data instance comprised by the sub-slice, whereby obtaining a plurality of performance measurements;
based on the plurality of performance measurements of the plurality of sub-slices, computing a performance measurement of the predictor over the slice for analysis; and in response to determining that the performance measurement of the predictor over the slice for analysis is below a threshold, performing a mitigating action.

13. A computer program product comprising a non-transitory computer readable storage medium retaining program instructions, which program instructions when read by a processor, cause the processor to perform:
obtaining a dataset, wherein the dataset comprising data instances, wherein each data instance is associated with a label;
obtaining a predictor, wherein the predictor is configured to provide a prediction of a label for a data instance;
determining a plurality of data slices, wherein at least one data slice of the plurality of data slices comprising a data instance comprised by the dataset;
computing, for each data slice in the plurality of data slices, a performance measurement of the predictor over the data slice, wherein said computing is based on an application of the predictor on each data instance that is mapped to the data slice, wherein the performance measurement is indicative of a successful label prediction for a data instance comprised by the data slice, whereby obtaining a plurality of performance measurements, wherein said computing the performance measurement of the predictor over the dataset is performed based on the formula;

$$f(D) = \frac{\sum_{s \in} sg(s)}{|D|},$$

wherein D is the data, wherein g(s) provides a value of the performance measurement of the data slice s, wherein g(s) is defined as follows:

$$g(s) = \begin{cases} -1 & P(s) < MinP \\ -1 & |s| < MinSize \\ 1 & P(s) \geq MinP \land |s| \geq MinSize \end{cases}$$

wherein P(s) is a value of the performance measurement of the predictor over the data slice s, wherein MinP is a minimal performance measurement threshold, wherein MinSize is a minimal size threshold, wherein MinSize is defined based on a number of features in a feature space of the dataset D;
based on the plurality of performance measurements of the plurality of data slices, computing a performance measurement of the predictor over the dataset; and
in response to determining that the performance measurement of the predictor is below a threshold, performing a mitigating action.

14. The computer program product of claim 13, wherein said computing, for each data slice in the plurality of data slices, the performance measurement of the predictor over each data slice, comprises: computing the performance measurement of the predictor over a data slice, wherein said computing the performance measurement of the predictor over the data slice comprises:
determining a number of data instances that are mapped to the data slice;
in response to the number of data instances being below a threshold, determining the performance measurement of the predictor over the data slice to be a predetermined value.

15. The computer program product of claim 13, wherein said computing, for each data slice in the plurality of data slices, the performance measurement of the predictor over the data slice, comprises: computing the performance measurement of the predictor over a data slice, wherein said computing the performance measurement of the predictor over the data slice comprises:
determining a confidence level of the performance measurement for the data slice; and
in response to determining that the confidence level is below a confidence level threshold, determining that the performance measurement of the predictor over the data slice to be a predetermined value.

16. The computer program product of claim 13, wherein said determining the plurality of data slices comprising:
obtaining a constraint representing a definition of a data slice; and
applying the constraint on the dataset, whereby identifying one or more data instances that are members of the data slice defined using the constraint.

17. A computerized apparatus comprising: the computer program product of claim 13; and the processor.

18. A computer program product, comprising a non-transitory computer readable storage medium retaining program instructions, which program instructions when read by a processor, cause the processor to perform:
obtaining a dataset, wherein the dataset comprising data instances, wherein each data instance is associated with a label, wherein the dataset is a super-slice, wherein a data superset comprises a plurality of data instances each of which is associated with a label, wherein the data superset is divided into one or more super-slices:
obtaining a predictor, wherein the predictor is configured to provide a prediction of a label for a data instance;
determining a plurality of data slices, wherein at least one data slice of the plurality of data slices comprising a data instance comprised by the dataset;
computing, for each data slice in the plurality of data slices, a performance measurement of the predictor over the data slice, wherein said computing is based on an application of the predictor on each data instance that is mapped to the data slice, wherein the performance measurement is indicative of a successful label prediction for a data instance comprised by the data slice, whereby obtaining a plurality of performance measurements, whereby a performance measurement of the predictor over the super-slice is the performance measurement of the predictor over the dataset
based on the plurality of performance measurements of the plurality of data slices, computing a performance measurement of the predictor over the dataset; and
in response to determining that the performance measurement of the predictor is below a threshold, performing a mitigating action.

* * * * *